(12) United States Patent
Iwasawa

(10) Patent No.: US 7,405,887 B2
(45) Date of Patent: Jul. 29, 2008

(54) ZOOM LENS AND IMAGING DEVICE USING ZOOM LENS

(75) Inventor: Yoshito Iwasawa, Tokyo (JP)

(73) Assignee: Sony Corporation, Tokyo (JP)

(*) Notice: Subject to any disclaimer, the term of this patent is extended or adjusted under 35 U.S.C. 154(b) by 49 days.

(21) Appl. No.: 10/556,753

(22) PCT Filed: Feb. 15, 2005

(86) PCT No.: PCT/JP2005/002280

§ 371 (c)(1),
(2), (4) Date: Nov. 15, 2005

(87) PCT Pub. No.: WO2005/091045

PCT Pub. Date: Sep. 29, 2005

(65) Prior Publication Data

US 2007/0024984 A1   Feb. 1, 2007

(30) Foreign Application Priority Data

Mar. 17, 2004   (JP) .............................. 2004-077213

(51) Int. Cl.
*G02B 15/14* (2006.01)
*G02B 17/00* (2006.01)

(52) U.S. Cl. ........................................ 359/691; 359/736

(58) Field of Classification Search ................. 359/686, 359/689, 691, 726, 738, 739, 38, 736
See application file for complete search history.

(56) References Cited

U.S. PATENT DOCUMENTS

| 2001/0038496 A1 | 11/2001 | Yamamoto et al. |
| 2003/0193722 A1 | 10/2003 | Mihara |
| 2004/0027685 A1* | 2/2004 | Mihara et al. ............... 359/686 |

FOREIGN PATENT DOCUMENTS

| JP | 2001-343588 | 12/2001 |
| JP | 2003-302576 | 10/2003 |
| JP | 2003 344897 | 12/2003 |
| JP | 2004 37927 | 2/2004 |
| JP | 2004 246141 | 9/2004 |

* cited by examiner

*Primary Examiner*—Ricky L Mack
*Assistant Examiner*—William C Choi
(74) *Attorney, Agent, or Firm*—Frommer Lawrence & Haug LLP; William S. Frommer; Thomas F. Presson

(57) ABSTRACT

The present invention is directed to a zoom lens used for image pick-up optical system of digital still camera, or video camera, and is composed, in order from the object side, of a first group GR1 including a reflection member for bending or folding the optical axis and having negative refractive power, a second group GR2 having negative refractive power, a third group GR3 having positive refractive power, and a fourth group GR4 having positive refractive power, wherein a light quantity adjustment member ST1 for adjusting light quantity is fixed during zooming operation.

5 Claims, 12 Drawing Sheets

ZOOM LENS AND IMAGING DEVICE USING ZOOM LENS

TECHNICAL FIELD

The present invention relates to a zoom lens compact and adapted for performing realization of thin structure in a camera depth direction, which is suitable when used in image pick-up optical system of a digital input/output equipment such as digital still camera or video camera, etc., and an image pick-up apparatus using such a zoom lens.

This Application claims priority of Japanese Patent Application No. 2004-077213, filed on Mar. 17, 2004, the entirety of which is incorporated by reference herein.

BACKGROUND ART

In recent years, image pick-up apparatuses using solid-state image pick-up device such as digital still camera, etc. are being popularized. With popularization of such digital still camera, realization of higher picture quality is required. Particularly, in digital still camera having a large number of pixels, etc., photographing (imaging) lenses excellent in image formation performance, particularly zoom lenses, which comply with solid-state image pick-up device having a large number of pixels are required. Further, there also exists demands for miniaturization, and particularly zoom lenses in which realization of thin structure in the camera depth direction is attained are required.

For example, as a zoom lens which is compact and is excellent in image formation performance, there conventionally exists a three group zoom lens consisting of a negative first lens group, a positive second lens group and a positive third lens group in order from the object side as described in the Japanese Patent Application Laid Open No. 2002-350726 publication. In the optical system disclosed in this publication, length of the optical system lens total thickness is limit as thickness in the camera depth direction at the time of sinking barrel so that it cannot be said that miniaturization in the camera depth direction is sufficient.

On the other hand, there is known a zoom lens in which prism is inserted between lenses to thereby bend or fold the optical system so that miniaturization in the optical axis direction has been further promoted. For example, as described in the Japanese Patent Application Laid Open No. 1996-248318 publication, the optical axis is bent or folded by using prism within four group zoom lens optical system consisting of a positive first lens group, a negative second lens group, a positive third lens group and a positive fourth lens group in order from the object side to thereby realize miniaturization in the optical axis direction. In the optical system described in this publication, front (optical) gem (front lens element) and reflection member are large so that miniaturization is not sufficient.

DISCLOSURE OF THE INVENTION

Problems to be Solved by the Invention

An object of the present invention is to provide a novel zoom lens which can solve problems that conventional zoom lenses have, and an image pick-up apparatus using such a zoom lens.

Another object of the present invention is to provide a zoom lens compact and adapted for attaining realization of thin structure in camera depth direction which is used in video camera or digital still camera, etc., and an image pick-up apparatus using such a zoom lens.

The zoom lens according to the present invention comprises, in order from an object side, a first group including a reflection member for bending or folding the optical axis and having negative refractive power, a second group having negative refractive power, and a light quantity adjustment member fixed during magnification changing or adjustment operation and serving to adjust light quantity.

Moreover, the zoom lens according to the present invention comprises, in order from an object side, a first group including a reflection member for bending or folding the optical axis and having negative refractive power, a second group having negative refractive power, a third group having positive refractive power, and a fourth group having positive refractive power, wherein a light quantity adjustment member for adjusting light quantity is fixed during magnification changing or adjustment operation.

The image pick-up apparatus according to the present invention is directed to an image pick-up apparatus comprising a zoom lens, and an image pick-up device for converting an optical image formed by the zoom lens into an electric signal, wherein there is used, as a zoom lens used in the image pick-up apparatus, a zoom lens comprising, in order from an object side, a first group including a reflection member for bending or folding the optical axis and having negative refractive power, a second group having negative refractive power, and a light quantity adjustment member fixed during magnification changing or adjustment operation and serving to adjust light quantity, or a zoom lens comprising, in order from an object side, a first group including a reflection member for bending or folding the optical axis and having negative refractive power, a second group having negative refractive power, a third group having positive refractive power, and a fourth group having positive refractive power, wherein a light quantity adjustment member for adjusting light quantity is fixed during magnification changing or adjustment operation.

In the zoom lens according to the present invention, the length in the incident optical axis direction can be greatly shortened while maintaining high magnification changeable ratio and high picture quality, and there is employed the so-called minus lead configuration in which the first and second lens groups are caused to have negative refractive power. Thus, the front gem (front optical element) and the reflection member can be reduced. In addition, since the light quantity adjustment member for adjusting light quantity is fixed during zooming operation, mirror cylindrical configuration can become compact.

In the zoom lens of the present invention, the length in the incident optical axis direction can be greatly reduced while maintaining high magnification changeable ratio and high picture quality, and the optical front gem and the reflection member can be reduced by the minus lead configuration. Moreover, since the light quantity adjustment member for adjusting light quantity is fixed during zooming operation, the mirror cylindrical configuration can become compact.

In the image pick-up apparatus of the present invention, image formation performance is improved, and the length in the incident optical axis direction of the zoom lens system is reduced so that the front gem diameter and the reflection member can be reduced, and the mirror cylindrical configuration can become compact. Accordingly, compact configuration and thin structure of the image pick-up apparatus can be realized.

The present invention is applied, thereby making it possible to attain improvement in image formation performance and miniaturization of zoom lens used in video camera or digital still camera, etc.

Still further objects of the present invention, and practical merits obtained by the present invention will become more apparent from the embodiments which will be given below with reference to the attached drawings.

BEST MODE FOR CARRYING OUT THE INVENTION

The first to fourth embodiments of a zoom lens of the present invention will now be explained with reference to FIGS. 1 to 4.

FIGS. 1 to 4 are lens configurations diagrams respectively corresponding to the zoom lens systems constituting these first to fourth embodiments, and show lens arrangements at wide-angle end state (a) and telescopic end state (b) by optical cross section. Arrows mj (j=1, 2, . . . ) in respective lens configuration diagrams show, in a model form, movements of the j-th lens group (GRj), etc. at zooming operation from wide-angle end state (a) to telescopic end state (b). Moreover, in respective lens configuration diagrams, plane to which ri (I=1, 2, . . . ) is attached is the i-th plane when counted from the object surface side. Further, in respective lens configuration diagrams, I indicates image surface of image pick-up device, CG indicates cover glass of the image pick-up device, and LPF indicates low pass filter.

Figure 1A:
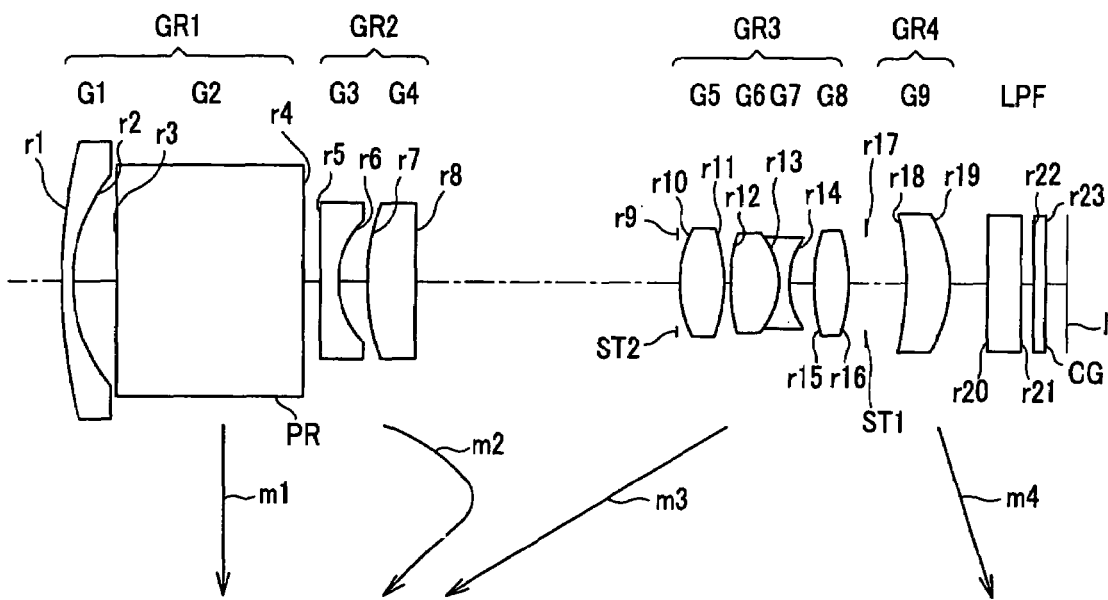
FIG. 1 is a lens configuration diagram of a first embodiment of a zoom lens to which the present invention is applied.
Figure 1B:
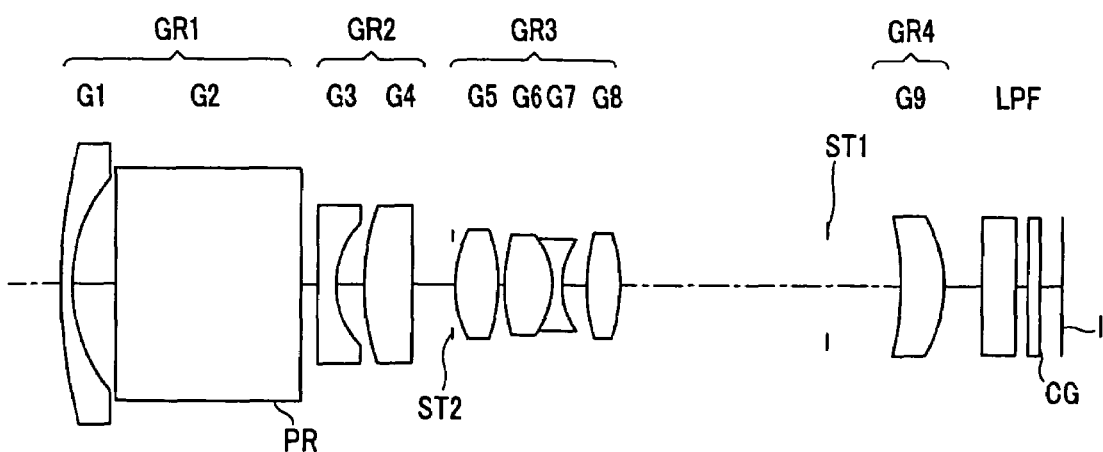

As shown in the lens configuration diagram of FIG. 1, the zoom lens of the first embodiment is composed, in order from the object side, a negative first lens group GR1, a negative second lens group GR2, a positive third lens group GR3, a light quantity adjustment member ST1, and a positive fourth lens group GR4.

The first lens group GR1 is composed of a negative lens, and a rectangular prism for bending or folding the optical axis by 90°. The second lens group GR2 is composed of a negative lens having non-spherical surface at the image surface side thereof, and a positive lens. The third lens group GR3 is composed of a positive lens having non-spherical surfaces at both surface sides thereof, a connection lens of the positive lens and a negative lens, and a positive lens. The fourth lens group GR4 is comprised of positive lens having non-spherical surface at the object side thereof. Between the third lens group GR3 and the fourth lens group GR4, there are fixed an iris for adjusting light quantity, a ND filter, and a light quantity adjustment member ST1 such as liquid crystal, etc. The positions of the first lens group GR1 and the low pass filter LPF are fixed at zooming operation. Moreover, the third lens group GR3 includes an aperture limiting member ST2 for limiting aperture diameter at the side closest to the object. The aperture limiting member ST2 is only required to limit aperture diameter. For example, light shielding plate, etc. is used for this purpose.

In performing magnification changing or adjustment operation from the wide-angle end state shown in (a) of FIG. 1 to the telescopic end state shown in (b) of FIG. 1, the second lens group GR2 moves toward the image surface side thereafter to take a U-turn toward the object side, and the third lens group GR3 moves towards the object side and the fourth lens group GR4 slightly moves toward the image surface side.

Figure 17:
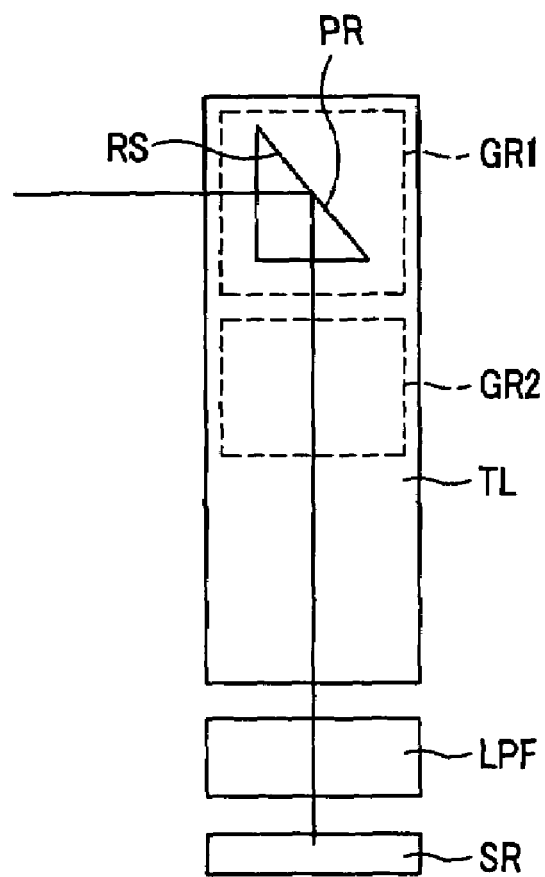
FIG. 17 is a view showing outline of the configuration of the present invention.

Moreover, actual arrangement in the shortest focal length state of the zoom lens system of the first embodiment is shown in FIG. 17. While the configuration of the reflection member is schematically indicated as parallel flat plate in the lens configuration diagram of FIG. 1, perpendicular prism PR is disposed as an actual configuration as shown in FIG. 17. Here, in FIG. 17, TL indicates zoom lens system, RS indicates reflection surface of the perpendicular prism PR, and SR indicates image pick-up device. It is to be noted that such a configuration is similar also in the zoom lens systems of second and third embodiments which will be described later. Further, also in the zoom lens system of the fourth embodiment, a reflection mirror M having reflection surface RS is disposed at the position of the perpendicular prism PR in FIG. 17.

Figure 2A:
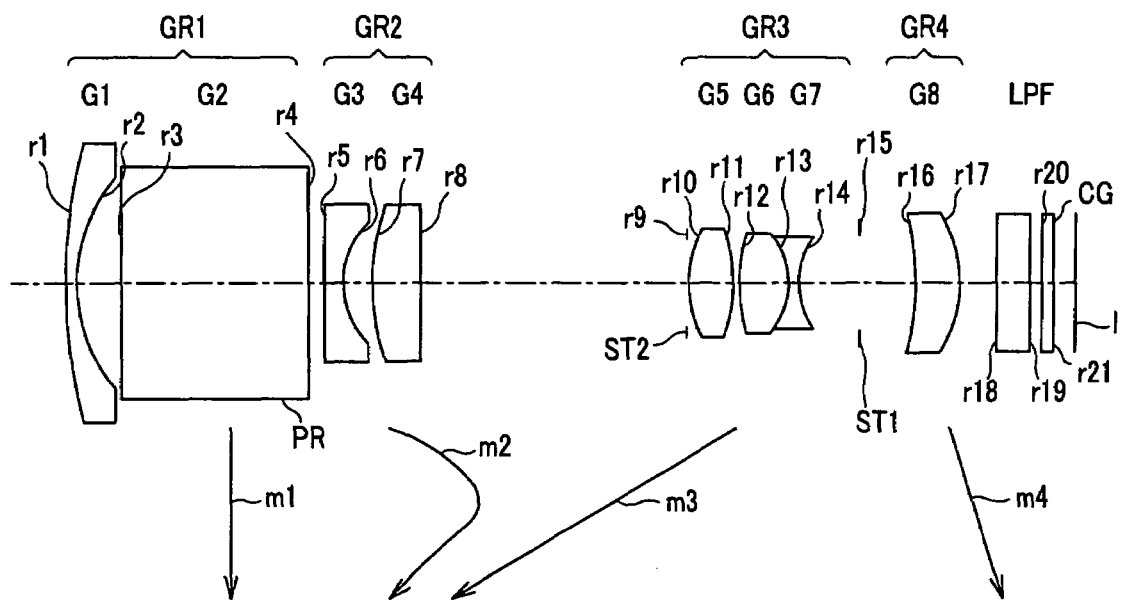
FIG. 2 is a lens configuration diagram of a second embodiment of a zoom lens to which the present invention is applied.
Figure 2B:
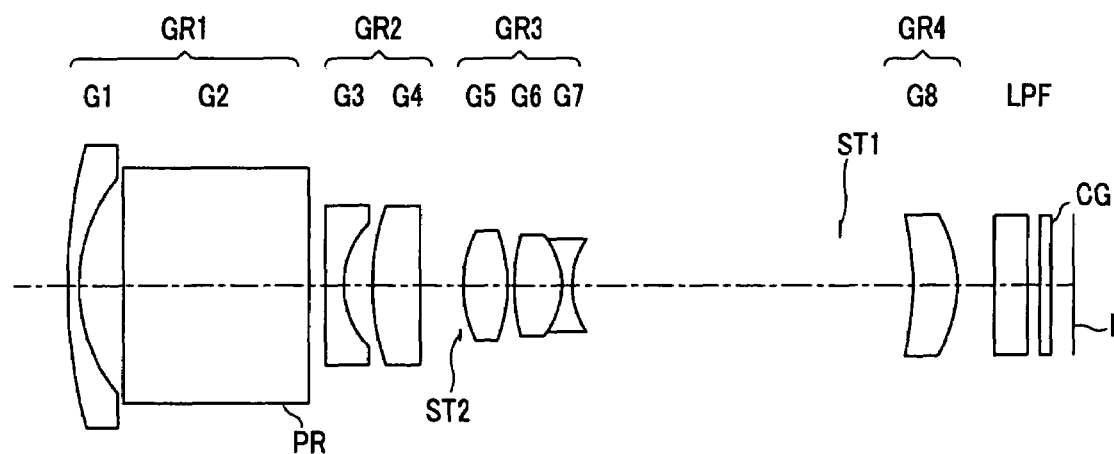

As shown in the lens configuration diagram of FIG. 2, the zoom lens of the second embodiment is composed, in order from the object side, of a negative first lens group GR1, a negative second lens group GR2, a positive third lens group GR3, a light quantity adjustment member ST1, and a positive fourth lens group GR4.

The first lens group GR1 is composed of a negative lens, and a perpendicular prism PR for bending or folding the optical axis by 90°. The second lens group GR2 is composed of a negative lens having non-spherical surface at the image side thereof, and a positive lens. The third lens group GR3 is composed of a positive lens having non-spherical surfaces at both surface sides thereof, and a connection lens of the positive lens and a negative lens. The fourth lens group GR4 is comprised of plastic positive lens having non-spherical surfaces at both surface sides thereof. Between the third lens group GR3 and the fourth lens group GR4, there are fixed an iris for adjusting light quantity, a ND filter and a light quantity adjustment member ST1 such as liquid crystal, etc. The positions of the first lens group GR1 and the low pass filter LPF are fixed during zooming operation. Moreover, the third lens group GR3 includes an aperture limiting member ST2 for limiting aperture diameter at the side closest to the object. The aperture limiting member ST2 is only required to limit aperture diameter. For example, a light shielding plate, etc. is used for this purpose.

In performing magnification changing or adjustment operation from the wide-angle end state shown in (a) of FIG. 2 to the telescopic end state shown in (b) of FIG. 2, the second lens group GR2 moves toward the image surface side thereafter to take a U-turn toward the object side, and the third lens group GR3 moves towards the object side and the fourth lens group GR4 slightly moves towards the image surface side.

The zoom lens of the third embodiment is composed, in order from the object side, a negative first lens group GR1, a negative second lens group GR2, a positive third lens group GR3, a light quantity adjustment member ST1, and a positive fourth lens group GR4.

The first lens group GR1 is composed of a negative lens, and a perpendicular prism PR for bending or folding the optical axis by 90°. The second lens group GR2 is composed of a plastic negative lens having non-spherical surfaces at both surface sides thereof, and a positive lens. The third lens group GR3 is composed of a positive lens, a connection lens of the positive lens and a negative lens, and a plastic positive lens having non-spherical surfaces at both surface sides thereof. The fourth lens group GR4 is comprised of plastic positive lens having non-spherical surfaces at both surface sides thereof. Between the third lens group GR3 and the fourth lens group GR4, there are fixed an iris for adjusting light quantity, a ND filter, and a light quantity adjustment member ST1 such as liquid crystal, etc. The positions of the first lens group GR1 and the low-pass filter LPF are fixed during zooming operation. Moreover, the third lens group GR3 includes an aperture limiting member ST2 for limiting aperture diameter at the side closest to the object. The aperture limiting member ST2 is only required to limit the aperture diameter. For example, light shielding plate, etc. is used for this purpose.

Figure 3A:
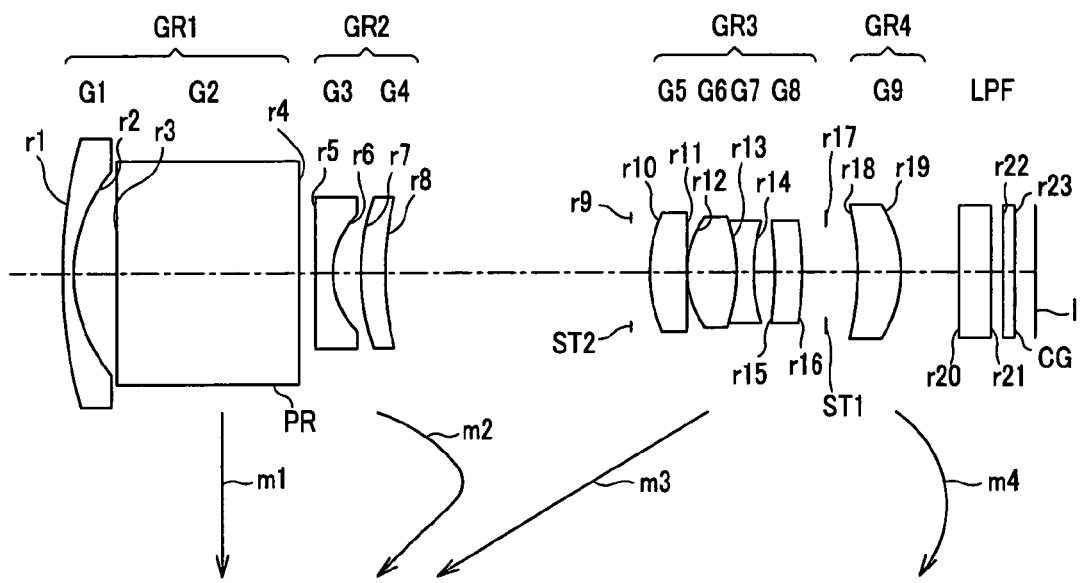
FIG. 3 is a lens configuration diagram of a third embodiment of a zoom lens to which the present invention is applied.
Figure 3B:
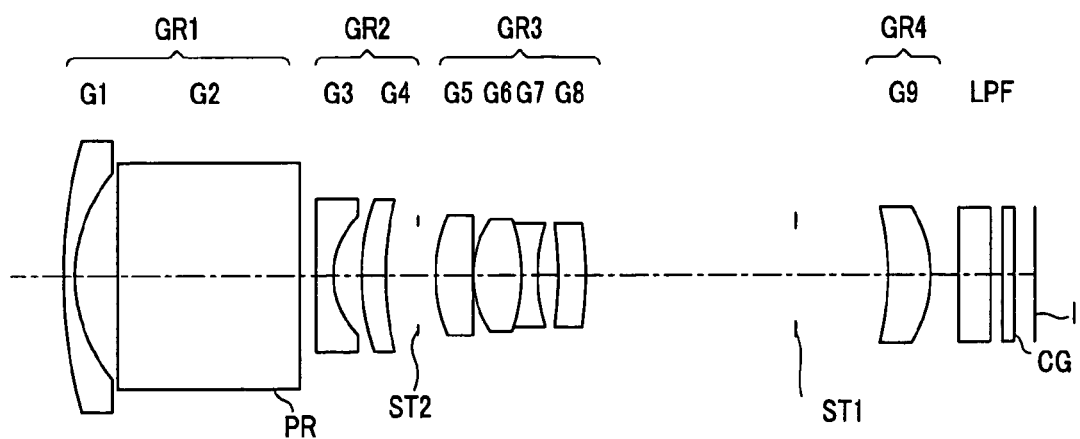

In performing magnification changing or adjustment operation from the wide-angle end state shown in (a) of FIG. 3 to the telescopic end state shown in (b) of FIG. 3, the second lens group GR2 moves toward the image surface side thereafter to take a U-turn toward the object side, and the third lens group GR3 moves toward the object side and the fourth lens group GR4 moves toward the image surface side thereafter to take a U-turn toward the object side.

The zoom lens of the fourth embodiment is composed, in order from the object side, a negative first lens group GR1, a negative second lens group GR2, a positive third lens group GR3, a light quantity adjustment member ST1, and a positive fourth lens group GR4.

The first lens group GR1 is composed of a negative lens, and a reflection mirror M for bending or folding the optical axis by 90°. The second lens group GR2 is composed of a negative lens having non-spherical surfaces at both surface sides thereof, and a positive lens. The third lens group GR3 is composed of a positive lens having non-spherical surfaces at both surface sides thereof, a connection lens of the positive lens and a negative lens, and a positive lens. The fourth lens group GR4 is comprised of positive lens having non-spherical surfaces at both surface sides thereof. Between the third lens group GR3 and the fourth lens group GR4, there are fixed an iris for adjusting light quantity, a ND filter, and a light quantity adjustment member ST1 such as liquid crystal, etc. The positions of the first lens group GR1 and the low-pass filter LPF are fixed during zooming operation. Moreover, the third lens group GR3 includes an aperture limiting member ST2 for limiting aperture diameter at the side closest to the object. The aperture limiting member ST2 is only required to limit the aperture diameter. For example, light shielding plate, etc. is used for this purpose.

Figure 4A:
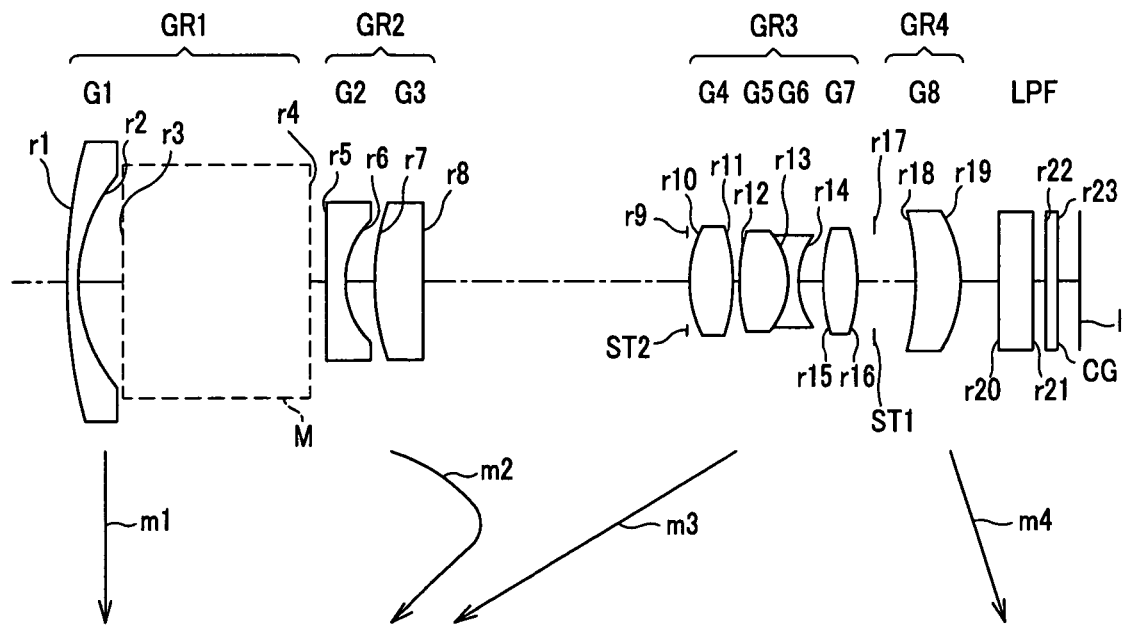
FIG. 4 is a lens configuration diagram of a fourth embodiment of a zoom lens to which the present invention is applied.
Figure 4B:
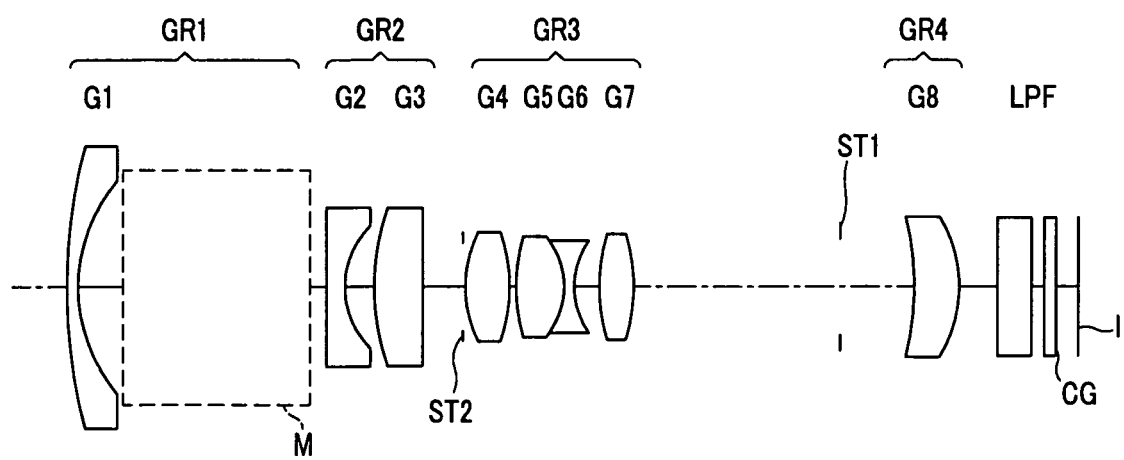

In performing magnification changing or adjustment operation from the wide-angle end state shown in (a) of FIG. 4 to the telescopic end state shown in (b) of FIG. 4, the second lens group GR2 moves toward the image surface side thereafter to take a U-turn toward the object side, and the third lens group GR3 moves towards the object side and the fourth lens group GR4 slightly moves towards the image surface side.

At the above-described zoom lenses of the first to fourth embodiments, there is employed such a configuration to bend or fold the optical axis by substantially 90° by the reflection member to thereby have ability to greatly shorten the length in the incident optical axis direction, and to overlap optical path of object light in the vicinity of the reflection surface. Accordingly, space can be effectively used and miniaturization can be made. In the above-described zoom lens, the position of the reflection member is caused to be position of the first lens group disposed at the side closest to the object, thereby making it possible to attain miniaturization of the image pick-up apparatus using zoom lens.

Moreover, in the zoom lenses of the first to fourth embodiments, there is employed the so-called minus lead configuration for allowing the first lens group and the second lens group to have negative refractive power, thereby making it possible to reduce the front gem (front optical element) diameter and the reflection member.

Further, in the zoom lenses of the first to fourth embodiments, complicated mirror cylindrical configuration is not required, and realization of compact configuration and thin structure can be performed. Further, since the light quantity adjustment member ST1 is disposed between the third lens group GR3 and the fourth lens group GR4, miniaturization can be most effectively attained.

In the zoom lenses of the first to third embodiments, since perpendicular prism PR is used as the reflection member, spacing in transmission through prism results in reduced spacing shorter than physical spacing of ordinary air spacing in accordance with refractive index of medium as compared to the time when the reflection mirror is used. For this reason, it is possible to attain optically equivalent configuration by more compact space.

Then, the condition desirable to be satisfactory in the zoom lens system of minus•minus•plus•plus, or the zoom lens system beginning with minus•minus as in the first to fourth embodiments will be explained.

It is to be noted that while if respective conditions explained below can be respectively satisfied by themselves, it is possible to attain actions/effects corresponding thereto, it is a matter of course that a method of satisfying plural conditions is more desirable from viewpoints of optical performance and/or miniaturization, etc.

It is desirable to satisfy the following conditional formula or expression.

$$0.1 < |f1/f2| < 1.2 \qquad (1)$$

In the above formula, f1: focal length of the first lens group f2: focal length of the second lens group The conditional formula (1) is a conditional formula for prescribing focal length ratio between the first lens group and the second lens group. When the focal length ratio becomes equal to lower limit of the conditional formula (1) or less, focal length of the first lens group becomes short. As a result, correction of distortion aberration becomes difficult. When the focal length ratio exceeds the upper limit of the conditional formula (1), the focal length of the first group is elongated, leading to increase in the front gem diameter. Thus, miniaturization becomes difficult, and the focal length of the second lens group becomes short. As a result, eccentricity sensitivity of the second lens group is also increased.

Moreover, it is desirable to satisfy the following conditional formula (2).

$$1.6 < D12w/fw < 5 \qquad (2)$$

In the above formula,

D12w: spacing from the plane at the side closest to the image of the lens group of the object side from the reflection member at wide-angle end state up to plane at the side closest to the object of the second lens group, fw: focal length of the entire system at wide-angle end state.

The conditional formula (2) is a conditional formula for prescribing spacing from the plane at the side closest to the image of the lens group of the object side from the reflection member up to the plane at the side closest to the object of the second lens group. When the spacing from the plane at the side closest to the image of the lens group of the object side from the reflection member to the plane at the side closest to the object of the second lens group becomes equal to lower limit of the conditional formula (2) or less, negative power of the group before the reflection member becomes too strong. Thus, correction of distortion aberration becomes difficult. In addition, space of the reflection member is small, and it also becomes difficult to arrange the reflection member. On the other hand, when the above mentioned spacing is above the upper limit of the conditional formula (2), negative power of the group before the reflection member becomes weak, leading to increase of the front gem diameter and the reflection member. Thus, miniaturization becomes difficult.

Moreover, in connection with the configuration of the first group of the first to third embodiments, in the case where prism is used as reflection member for bending or folding the optical axis within the zoom lens system, it is desirable to use nitric material having high refractive index. It is desirable that the refractive index is 1.7 or more. It is more desirable that the refractive index is 1.8 or more.

When the refractive index of the prism is 1.7 or less, contribution to compact configuration would become small. Moreover, when the refractive index of the prism is 1.7 or more, the reflection condition becomes close to the total reflection condition so that light quantity loss is reduced. This is preferable. Further, when the refractive index of the prism is 1.8 or more, it is possible to further reduce light quantity loss.

The configuration of the zoom lens system used in the image pick-up lens apparatus to which the present invention is applied will be explained in more concrete terms by taking examples of numeric data and aberration diagrams, etc.

The embodiments 1 to 4 mentioned as an example here respectively correspond to the previously described first to fourth embodiments, and lens configuration diagrams representing the first to fourth embodiments (see FIGS. 1 to 4) respectively show lens configurations of corresponding embodiments 1 to 4.

In numeric data of respective embodiments, ri (i=1, 2, ...) indicates curvature of radius (mm) of the i-th plane when counted from the object side, di (i=1, 2, ...) indicates the i-th axial spacing (mm) when counted from the object side, ndi (i=1, 2, ...) indicates refractive index with respect to d line of the i-th optical element when counted from the object side, and vdi (i=1, 2, ...) indicates Abbe number with respect to the d line of the i-th optical element when counted from the object side.

Moreover, in the numeric data, axial spacing (di) to which (variable) is attached indicates variable spacing at wide-angle end state (short focal length end, W)~middle (intermediate focal length end, M)~telescopic end state (long focal length end, T) in zooming operation. Moreover, in numeric data, FNo. indicates F number, f indicates focal length (mm), and ω indicates half picture angle (°), wherein these values indicate values at the entire system corresponding to respective focal length states (W), (M), (T).

Moreover, in the numeric data, the plane indicated at (ASP) is non-spherical surface, and the shape of non-spherical surface is shape represented by the following formula.

$$x = \frac{y^2 \cdot c^2}{1 + (1 - \varepsilon \cdot y^2 \cdot c^2)^{1/2}} + \sum A^i \cdot Y^i \qquad \text{[Formula 1]}$$

In the above formula, x, y, c, ε and Ai are defined as below.

x: distance in the optical axis direction from lens surface summit point y: height in a direction perpendicular to the optical axis c: paraxial curvature at lens summit point ε: cone constant Ai: i-th non-spherical coefficient Respective numeric values and respective conditional. formulas for determining the conditional formula (1) and the conditional formula (2) of the zoom lenses shown in the above-described embodiments 1 to 4 are shown in the following Table 1.

Figure 5:
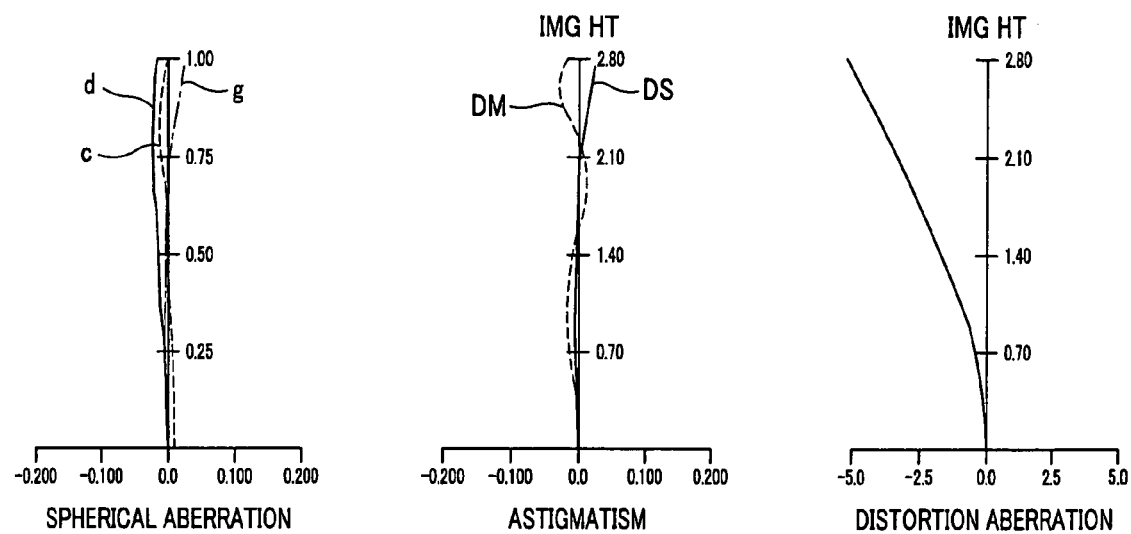
FIG. 5 is a view showing various aberrations at short focal length (distance) end of the embodiment 1 of the zoom lens to which the present invention is applied.
Figure 6:
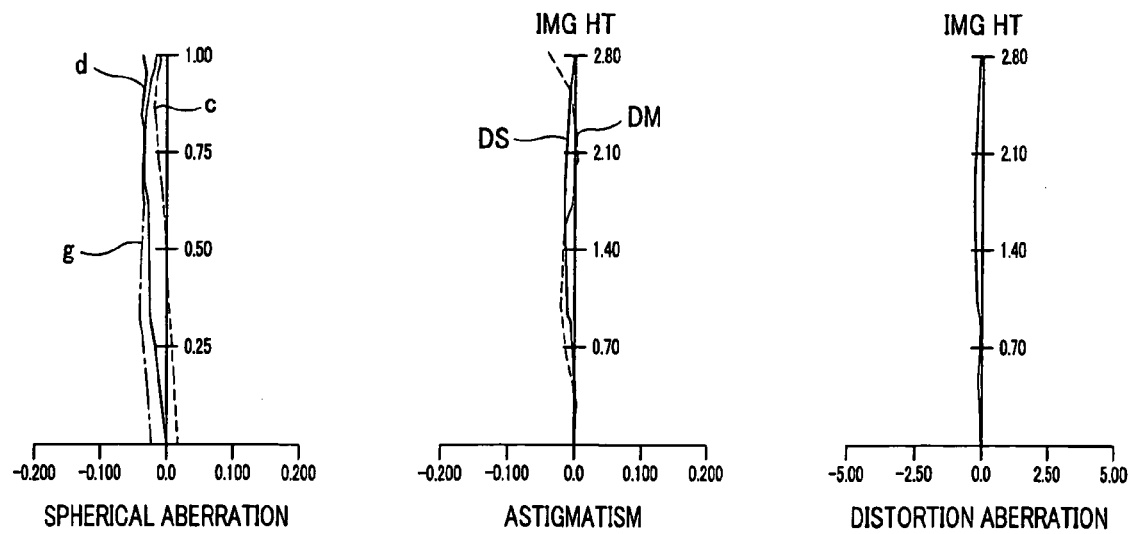
FIG. 6 is a view showing various aberrations at intermediate focal length of the embodiment 1 of the zoom lens to which the present invention is applied.
Figure 7:
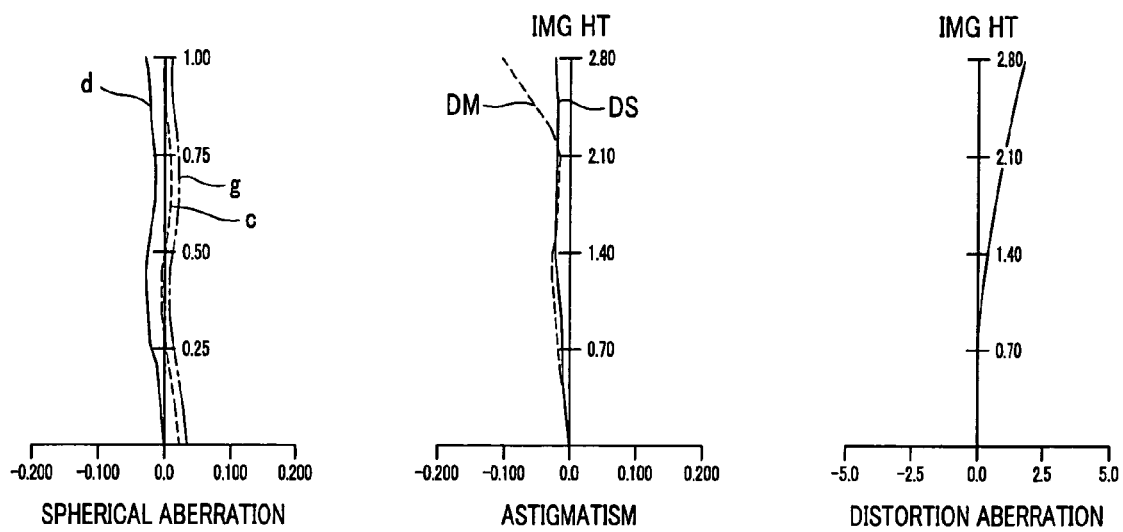
FIG. 7 is a view showing various aberrations at long focal length end of the embodiment 1 of the zoom lens to which the present invention is applied.
Figure 8:
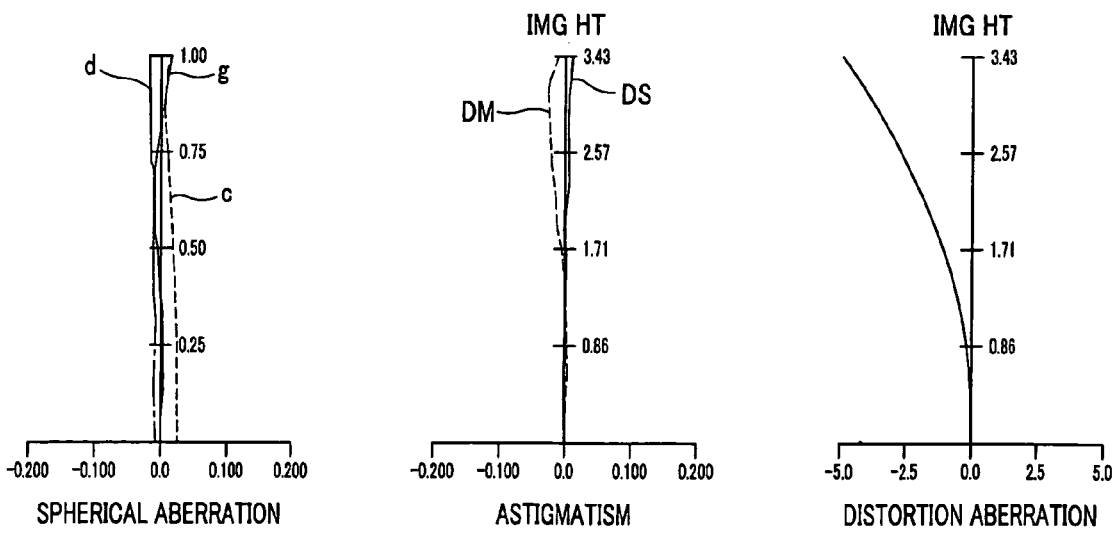
FIG. 8 is a view showing various aberrations at short focal length end of the embodiment 2 of the zoom lens to which the present invention is applied.
Figure 9:
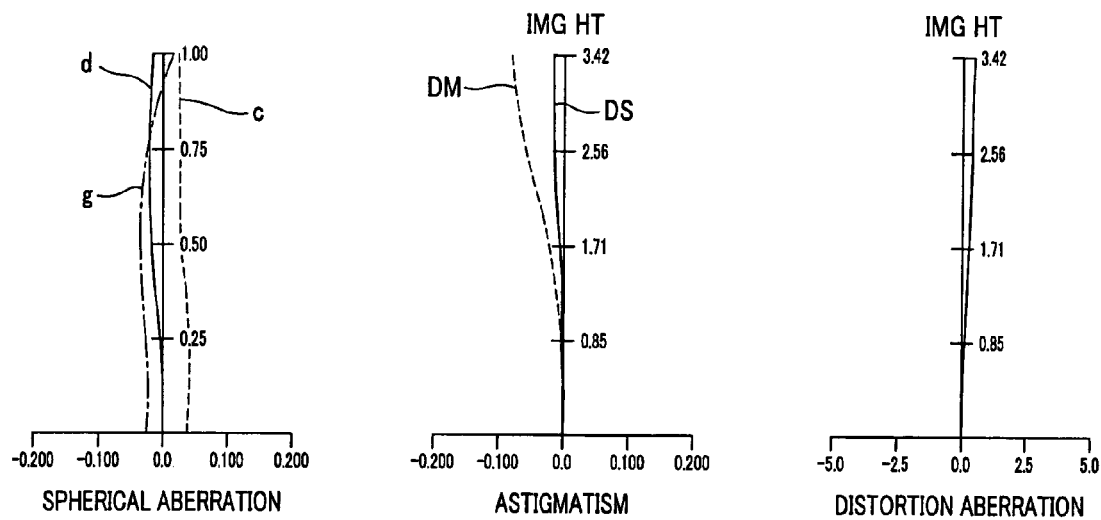
FIG. 9 is a view showing various aberrations at intermediate focal length of the embodiment 2 of the zoom lens to which the present invention is applied.
Figure 10:
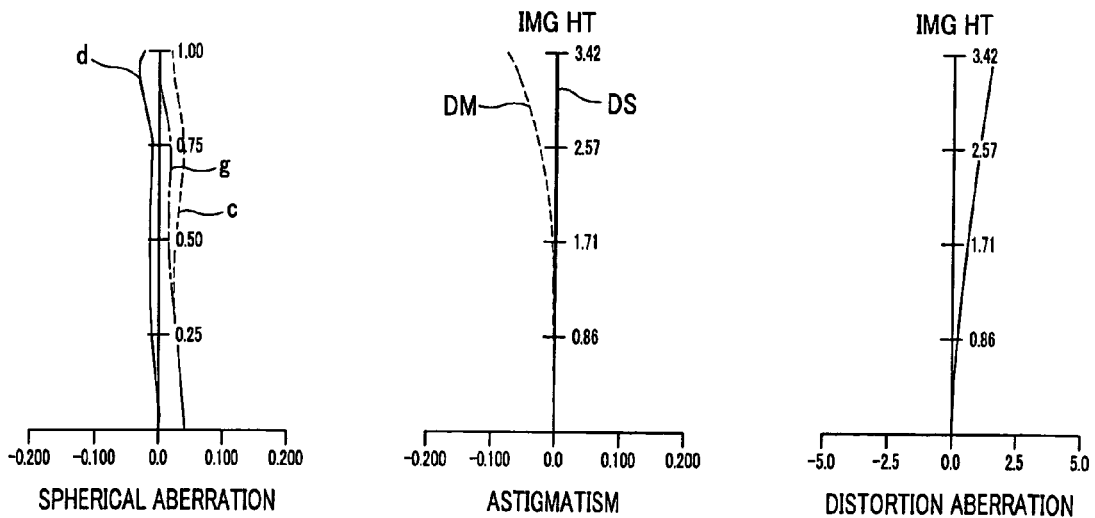
FIG. 10 is a view showing various aberrations at long focal length end of the embodiment 2 of the zoom lens to which the present invention is applied.
Figure 11:
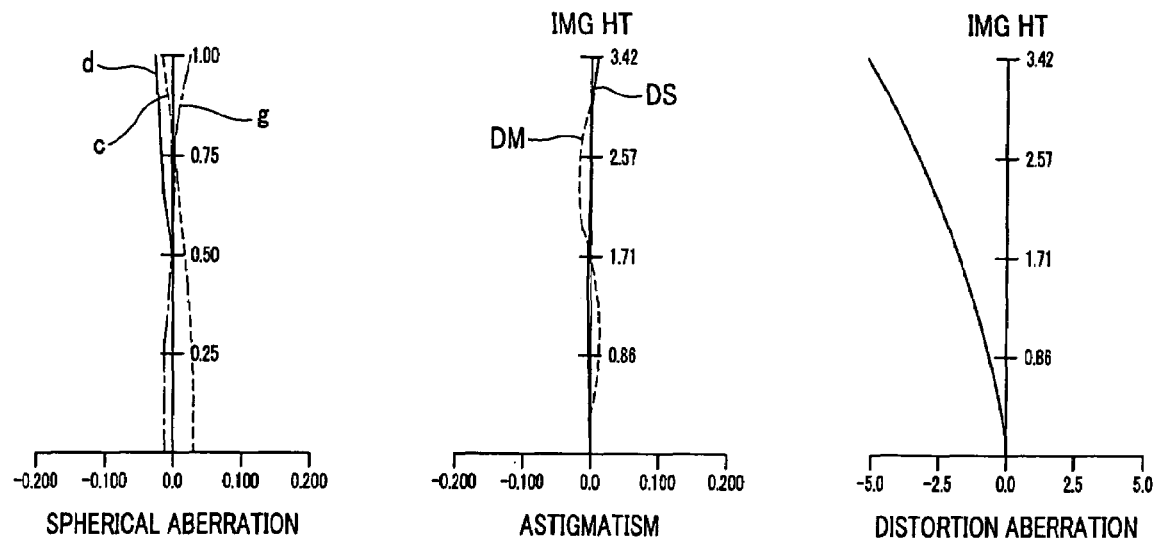
FIG. 11 is a view showing various aberrations at short focal length end of the embodiment 3 of the zoom lens to which the present invention is applied.
Figure 12:
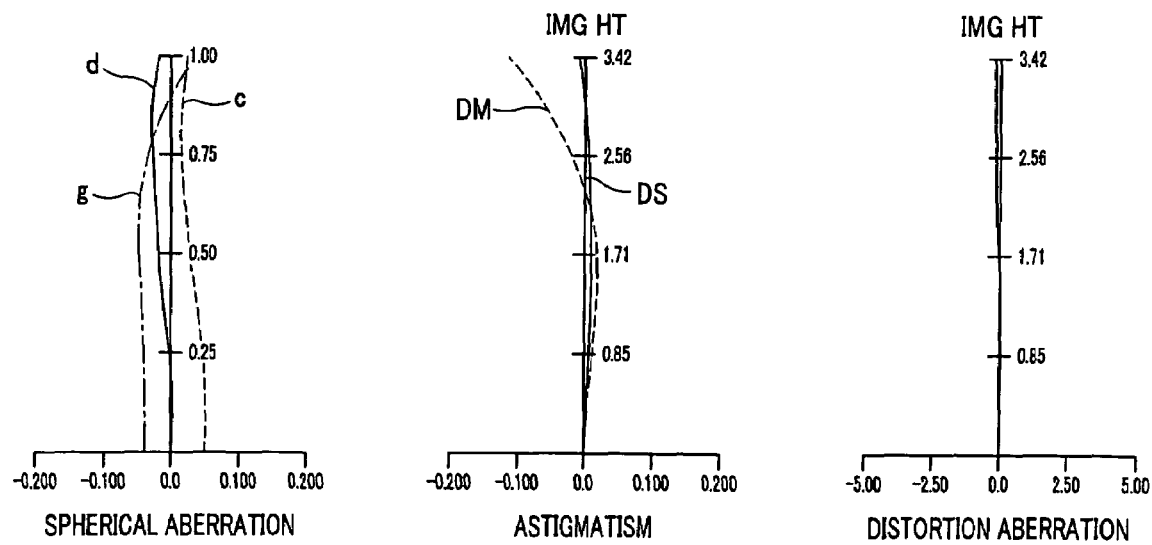
FIG. 12 is a view showing various aberrations at intermediate focal length of the embodiment 3 of the zoom lens to which the present invention is applied.
Figure 13:
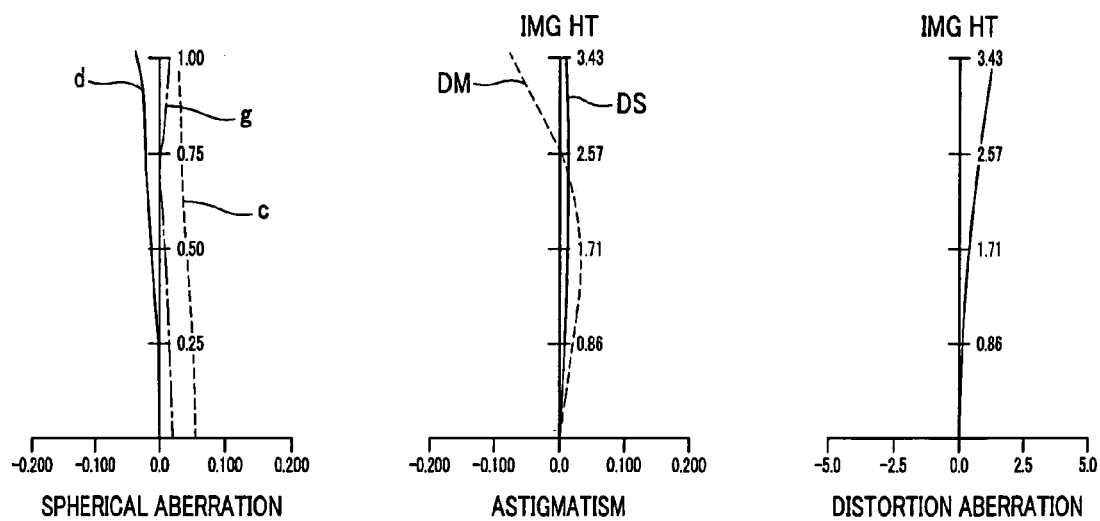
FIG. 13 is a view showing various aberrations at long focal length end of the embodiment 3 of the zoom lens to which the present invention is applied.
Figure 14:
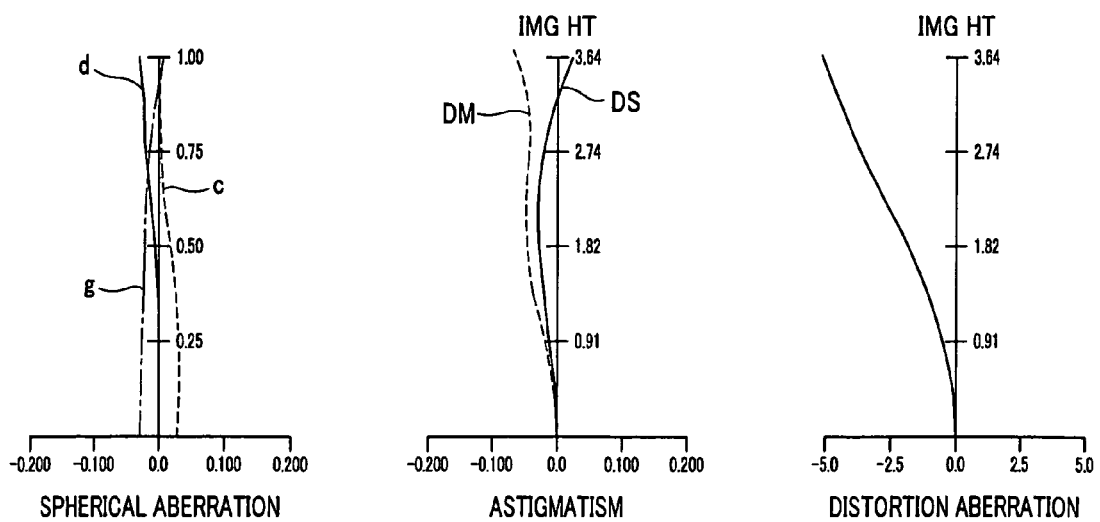
FIG. 14 is a view showing various aberrations at short focal length end of the embodiment 3 of the zoom lens to which the present invention is applied.
Figure 15:
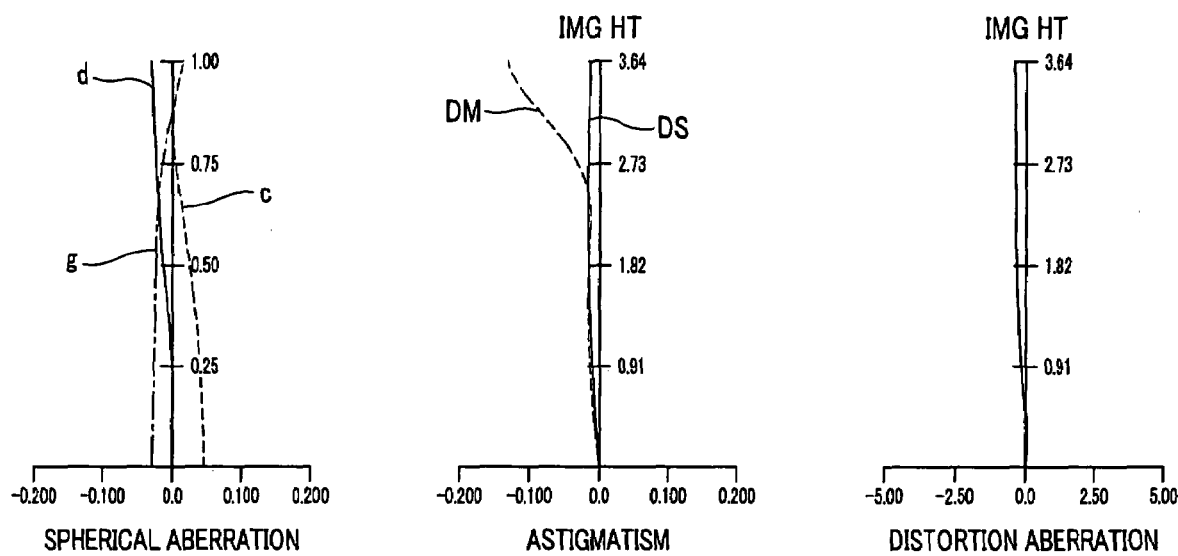
FIG. 15 is a view showing various aberrations at intermediate focal length of the embodiment 3 of the zoom lens to which the present invention is applied.
Figure 16:
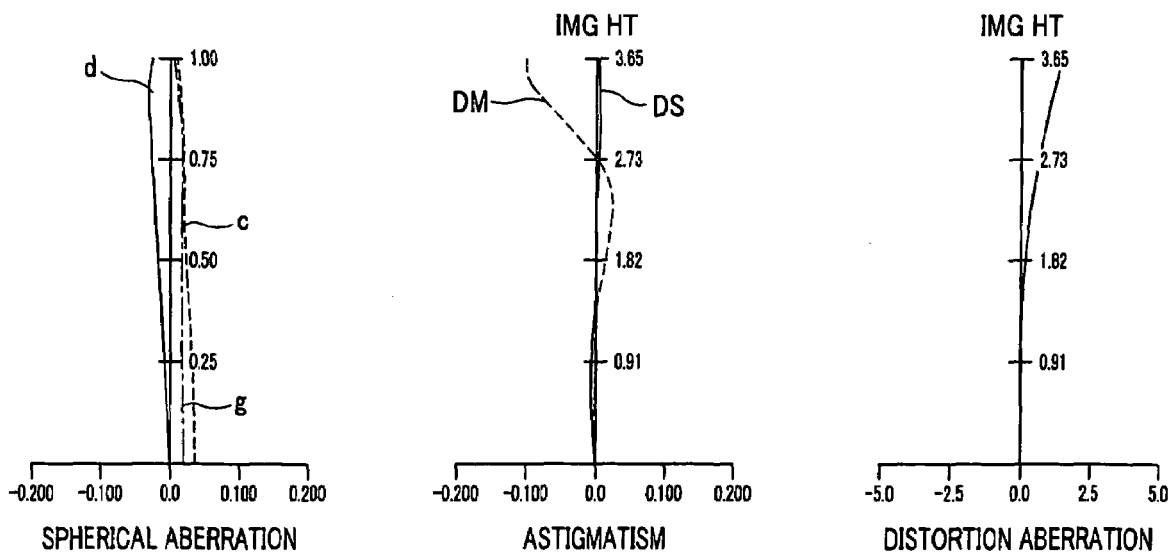
FIG. 16 is a view showing various aberrations at long focal length end of the embodiment 3 of the zoom lens to which the present invention is applied.

FIGS. 5 and 16 show various aberrations (spherical aberration, astigmatism and distortion aberration in order from the left) of the embodiments 1 to 4. In the case of the spherical aberration, ratio with respect to aperture F value is taken on the ordinate, and defocus is taken on the abscissa, wherein the solid line (d) indicates spherical aberration at the d line, the broken lines (c) indicate spherical aberration at the line c, and single dotted lines (g) indicate spherical aberration at g line. In the case of the astigmatism, the ordinate indicates image height (mm), the abscissa indicates focus, the solid line (DS) indicates image surface of sagittal, and broken lines (DM) indicate the image surface of meridional. In the case of the distortion aberration, the ordinate indicates image height (mm), and the abscissa indicates distortion %. Here, IMG HT indicates image height (mm).

Also apparent from the Table 1, the zoom lenses of the embodiments 1 to 4 satisfy the conditional formula (1) and the conditional formula (2). Moreover, as shown in the respective aberration diagrams, respective aberrations are corrected in well-balanced manner at wide-angle end state (W), intermediate focal length (M) between the wide-angle end state and the telescopic end state, and the telescopic end state (T).

<Embodiment 1>

(W)~(M)~(T)

| | |
|---|---|
| FNo. = | 2.86~4.15~5.17 |
| f = | 3.69~7.02~10.70 |
| ω = | 38.56~21.79~14.41 |
| d4 = | 0.880~3.827~0.880 |
| d8 = | 12.829~3.737~1.724 |
| d16 = | 1.405~7.550~12.510 |
| d17 = | 1.519~2.630~2.830 |
| d19 = | 2.151~1.040~0.840 |

| [Curvature of radius] | [Axial spacing] | [Refractive index] | [Abbe number] |
|---|---|---|---|
| r1 = 22.595 | d1 = 0.650 | nd1 = 1.88300 | vd1 = 40.805 |
| r2 = 8.409 | d2 = 2.300 | | |
| r3 = ∞ | d3 = 8.900 | nd2 = 1.84666 | vd2 = 23.785 |
| r4 = ∞ | d4 = (variable) | | |
| r5 = 81.924 | d5 = 0.900 | nd3 = 1.73077 | vd3 = 40.501 |
| r6 = 4.612 (ASP) | d6 = 1.410 | | |
| r7 = 9.874 | d7 = 2.100 | nd4 = 1.84666 | vd4 = 23.785 |
| r8 = 882.961 | d8 = (variable) | | |
| r9 = Aperture limiting member | d9 = 0.100 | | |
| r10 = 5.520 (ASP) | d10 = 2.200 | nd5 = 1.58313 | vd5 = 59.461 |
| r11 = −12.931 (ASP) | d11 = 0.320 | | |
| r12 = 24.065 | d12 = 2.220 | nd6 = 1.48749 | vd6 = 70.441 |
| r13 = −5.047 | d13 = 0.600 | nd7 = 1.64769 | vd7 = 33.841 |
| r14 = 4.327 | d14 = 1.145 | | |
| r15 = 12.000 | d15 = 1.411 | nd8 = 1.48749 | vd8 = 70.441 |
| r16 = −14.666 | d16 = (variable) | | |
| r17 = Light quantity adjustment member | d17 = (variable) | | |
| r18 = −18.906 (ASP) | d18 = 2.000 | nd9 = 1.77377 | vd9 = 47.200 |
| r19 = −9.058 | d19 = (variable) | | |
| r20 = ∞ | d20 = 1.530 | nd10 = 1.51680 | vd10 = 64.198 |
| r21 = ∞ | d21 = 0.500 | | |
| r22 = ∞ | d22 = 0.600 | nd11 = 1.51680 | vd11 = 64.198 |
| r23 = ∞ | | | |

[non-spherical data of the 6-th plane (r6)]

$\epsilon = 1$, $A4 = -0.154426 \times 10-2$, $A6 = -0.967007 \times 10-5$, $A8 = -0.441264 \times 10-5$, $A10 = 0.125661 \times 10-6$

[non-spherical data of the 10-th plane (r10)]

$\epsilon 1 = 1$, $A4 = -0.111861 \times 10-2$, $A6 = -0.460219 \times 10-4$ $A8 = 0.192625 \times 10-5$, $A10 = -0.101161 \times 10-5$

[non-spherical data of the 11-th plane (r11)]

$\epsilon 1 = 1$, $A4 = -0.540695 \times 10-3$, $A6 = 0.292235 \times 10-5$, $A8 = -0.817608 \times 10-5$, $A10 = -0.224752 \times 10-6$

[non-spherical data of the 18-th plane (r18)]

$\epsilon 1 = 1$, $A4 = -0.479030 \times 10-3$, $A6 = -0.679555 \times 10-4$, $A8 = 0.872286 \times 10-5$, $A10 = -0.361221 \times 10-6$ <Embodiment 2>

(W)~(M)~(T)

| | |
|---|---|
| FNo. = | 2.86~4.15~5.21 |
| f = | 5.71~10.84~16.54 |
| ω = | 32.24~17.45~11.52 |
| d4 = | 1.100~4.350~0.839 |
| d8 = | 15.058~4.456~1.651 |
| d14 = | 2.614~9.973~16.282 |
| d15 = | 3.236~4.582~4.629 |
| d17 = | 2.594~1.240~1.200 |

| [Curvature of radius] | [Axial spacing] | [Refractive index] | [Abbe number] |
|---|---|---|---|
| r1 = 24.631 | d1 = 0.700 | nd1 = 1.88300 | vd1 = 40.805 |
| r2 = 11.994 | d2 = 2.400 | | |
| r3 = ∞ | d3 = 10.800 | nd2 = 1.84666 | vd2 = 23.785 |
| r4 = ∞ | d4 = (variable) | | |
| r5 = −92.234 | d5 = 1.200 | nd3 = 1.80611 | vd3 = 40.734 |
| r6 = 8.121 (ASP) | d6 = 1.471 | | |
| r7 = 13.080 | d7 = 2.550 | nd4 = 1.84666 | vd4 = 23.785 |
| r8 = 264.232 | d8 = (variable) | | |
| r9 = Aperture limiting member | d9 = 1.071 | | |
| r10 = 8.616 (ASP) | d10 = 2.840 | nd5 = 1.48749 | vd5 = 70.441 |
| r11 = −11.801 (ASP) | d11 = 0.340 | | |
| r12 = 15.092 | d12 = 2.907 | nd6 = 1.72916 | vd6 = 54.674 |
| r13 = −7.318 | d13 = 0.800 | nd7 = 1.59270 | vd7 = 35.446 |
| r14 = 4.864 | d14 = (variable) | | |
| r15 = Light quantity adjustment member | d15 = (variable) | | |
| r16 = −31.547 (ASP) | d16 = 2.100 | nd8 = 1.52470 | vd8 = 56.236 |
| r17 = −10.101 (ASP) | d17 = (variable) | | |
| r18 = ∞ | d18 = 1.900 | nd9 = 1.51680 | vd9 = 64.198 |
| r19 = ∞ | d19 = 0.600 | | |
| r20 = ∞ | d20 = 0.700 | nd10 = 1.51680 | vd10 = 64.198 |
| r21 = ∞ | | | |

[non-spherical data of the 6-th plane (r6)]

$\epsilon 1 = 1$, $A4 = -0.236090 \times 10-3$, $A6 = 0.195539 \times 10-5$, $A8 = -0.240030 \times 10-6$, $A10 = 0.568074 \times 10-8$

[non-spherical data of the 10-th plane (r10)]

$\epsilon 1 = 1$, $A4 = -0.810299 \times 10-3$, $A6 = -0.309901 \times 10-6$, $A8 = -0.164625 \times 10-5$, $A10 = -0.132742 \times 10-8$

[non-spherical data of the 11-th plane (r11)]

$\epsilon 1 = 1$, $A4 = -0.150065 \times 10-3$, $A6 = 0.743678 \times 10-5$, $A8 = -0.226961 \times 10-5$, $A10 = 0.404500 \times 10-7$

[non-spherical data of the 16-th plane (r16)]

$\epsilon = 1$, $A4 = -0.209875 \times 10-3$, $A6 = -0.202921 \times 10-4$, $A8 = 0.765438 \times 10-6$, $A10 = 0.226804 \times 10-7$

[non-spherical data of the 17-th plane (r17)]

$\epsilon = 1$, $A4 = 0.271556 \times 10-3$, $A6 = -0.317324 \times 10-4$, $A8 = 0.132533 \times 10-5$, $A10 = 0.000000 \times 1000$ <Embodiment 3>

(W)~(M)~(T)

| | |
|---|---|
| FNo. = | 2.86~4.09~5.05 |
| f = | 5.70~10.83~16.53 |
| ω = | 32.26~17.56~11.55 |

-continued

<Embodiment 3>

| | |
|---|---|
| d4 = | 1.210~4.570~1.091 |
| d8 = | 14.658~4.102~1.239 |
| d16 = | 1.639~8.834~15.177 |
| d17 = | 1.600~4.137~3.761 |
| d19 = | 3.777~1.240~1.615 |

| [Curvature of radius] | [Axial spacing] | [Refractive index] | [Abbe number] |
|---|---|---|---|
| r1 = 24.599 | d1 = 0.700 | nd1 = 1.88300 | vd1 = 40.805 |
| r2 = 11.190 | d2 = 2.400 | | |
| r3 = ∞ | d3 = 10.450 | nd2 = 1.84666 | vd2 = 23.785 |
| r4 = ∞ | d4 = (variable) | | |
| r5 = −14.092 (ASP) | d5 = 1.360 | nd3 = 1.52470 | vd3 = 56.236 |
| r6 = 12.422 (ASP) | d6 = 1.400 | | |
| r7 = 10.136 | d7 = 1.880 | nd4 = 1.84666 | vd4 = 23.785 |
| r8 = 19.634 | d8 = (variable) | | |
| r9 = Aperture limiting member | d9 = 1.200 | | |
| r10 = 11.100 | d10 = 2.359 | nd5 = 1.58913 | vd5 = 61.253 |
| r11 = −99.119 | d11 = 0.100 | | |
| r12 = 7.694 | d12 = 2.947 | nd6 = 1.65844 | vd6 = 50.855 |
| r13 = −11.867 | d13 = 0.700 | nd7 = 1.71736 | vd7 = 29.501 |
| r14 = 7.244 | d14 = 1.300 | | |
| r15 = −43.564 | d15 = 1.700 | nd8 = 1.52470 | vd8 = 56.236 |
| r16 = −18.354 (ASP) | d16 = (variable) | | |
| r17 = Light quantity adjustment member | d17 = (variable) | | |
| r18 = −22.956 (ASP) | d18 = 2.550 | nd9 = 1.52470 | vd9 = 56.236 |
| r19 = −10.989 (ASP) | d19 = (variable) | | |
| r20 = ∞ | d20 = 1.870 | nd10 = 1.51680 | vd10 = 64.198 |
| r21 = ∞ | d21 = 0.600 | | |
| r22 = ∞ | d22 = 0.720 | nd11 = 1.51680 | vd11 = 64.198 |
| r23 = ∞ | | | |

[non-spherical data of the fifth plane (r5)]

$\epsilon = 1$, $A4 = 0.189079 \times 10^{-2}$, $A6 = -0.703670 \times 10^{-4}$
$A8 = 0.186108 \times 10^{-5}$, $A10 = -0.226657 \times 10^{-7}$
[non-spherical data of the sixth plane (r6)]

$\epsilon = 1$, $A4 = 0.193344 \times 10^{-2}$, $A6 = -0.666082 \times 10^{-4}$,
$A8 = 0.187470 \times 10^{-5}$, $A10 = -0.262350 \times 10^{-7}$
[non-spherical data of the 15-th plane (r15)]

$\epsilon = 1$, $A4 = -0.574999 \times 10^{-3}$, $A6 = 0.386315 \times 10^{-4}$,
$A8 = 0.964146 \times 10^{-6}$, $A10 = 0.000000 \times 1000$
[non-spherical data of the 16-th plane (r16)]

$\epsilon = 1$, $A4 = 0.195080 \times 10^{-3}$, $A6 = 0.465132 \times 10^{-4}$,
$A8 = 0.148996 \times 10^{-5}$, $A10 = 0.000000 \times 1000$
[non-spherical data of the 18-th plane (r18)]

$\epsilon = 1$, $A4 = -0.212753 \times 10^{-3}$, $A6 = 0.457906 \times 10^{-4}$,
$A8 = -0.413322 \times 10^{-6}$, $A10 = 0.000000 \times 1000$
[non-spherical data of the 19-th plane (r19)]

$\epsilon = 1$, $A4 = 0.133306 \times 10^{-3}$, $A6 = 0.284156 \times 10^{-4}$,
$A8 = 0.230880 \times 10^{-6}$, $A10 = 0.000000 \times 1000$ <Embodiment 4>

| | (W)~(M)~(T) |
|---|---|
| FNo. = | 2.87~4.34~5.53 |
| f = | 4.85~9.22~14.07 |
| ω = | 38.29~21.60~14.30 |
| d4 = | 0.780~4.152~0.780 |
| d8 = | 16.722~5.627~2.323 |
| d16 = | 2.243~9.966~16.642 |
| d17 = | 1.349~3.787~3.969 |
| d19 = | 3.640~1.202~1.020 |

| [Curvature of radius] | [Axial spacing] | [Refractive index] | [Abbe number] |
|---|---|---|---|
| r1 = 29.54 | d1 = 0.850 | nd1 = 1.88300 | vd1 = 40.805 |
| r2 = 11.27 | d2 = 3.800 | | |
| r3 = ∞ | d3 = 12.220 | | |
| r4 = ∞ | d4 = (variable) | | |
| r5 = 26.237 (ASP) | d5 = 1.200 | nd2 = 1.73077 | vd2 = 40.501 |
| r6 = 5.980 (ASP) | d6 = 2.320 | | |
| r7 = 12.918 | d7 = 2.740 | nd3 = 1.84666 | vd3 = 23.785 |
| r8 = 72.468 | d8 = (variable) | | |
| r9 = Aperture limiting member | d9 = 0.130 | | |
| r10 = 7.857 (ASP) | d10 = 3.420 | nd4 = 1.58313 | vd4 = 59.461 |
| r11 = −26.882 (ASP) | d11 = 1.200 | | |
| r12 = 11.250 | d12 = 2.938 | nd5 = 1.48749 | vd5 = 70.441 |
| r13 = −6.313 | d13 = 0.800 | nd6 = 1.67270 | vd6 = 32.171 |
| r14 = 5.285 | d14 = 0.913 | | |
| r15 = 16.649 | d15 = 1.525 | nd7 = 1.48749 | vd7 = 70.441 |
| r16 = −32.796 | d16 = (variable) | | |
| r17 = Light quantity adjustment member | d17 = (variable) | | |
| r18 = −47.622 (ASP) | d18 = 1.900 | nd8 = 1.77377 | vd8 = 47.200 |
| r19 = −14.003 (ASP) | d19 = (variable) | | |
| r20 = ∞ | d20 = 1.200 | nd9 = 1.51680 | vd9 = 64.198 |
| r21 = ∞ | d21 = 0.600 | | |
| r22 = ∞ | d22 = 0.500 | nd10 = 1.51680 | vd10 = 64.198 |
| r23 = ∞ | | | |

[non-spherical data of the fifth plane (r5)]

$\epsilon = 1$, $A4 = -0.199102 \times 10^{-4}$, $A6 = 0.120020 \times 10^{-4}$,
$A8 = -0.410454 \times 10^{-6}$, $A10 = 0.617981 \times 10^{-8}$
[non-spherical data of the sixth plane (r6)]

$\epsilon = 1$, $A4 = -0.633623 \times 10^{-3}$, $A6 = 0.841957 \times 10^{-5}$,
$A8 = -0.719036 \times 10^{-6}$, $A10 = 0.414281 \times 10^{-8}$
[non-spherical data of the 10-th plane (r10)]

$\epsilon = 1$, $A4 = -0.387456 \times 10^{-3}$, $A6 = 0.265755 \times 10^{-5}$,
$A8 = -0.858779 \times 10^{-6}$, $A10 = 0.215789 \times 10^{-9}$
[non-spherical data of the 11-th plane (r11)]

$\epsilon = 1$, $A4 = -0.309607 \times 10^{-3}$, $A6 = 0.973513 \times 10^{-5}$,
$A8 = -0.183569 \times 10^{-5}$, $A10 = 0.398642 \times 10^{-7}$
[non-spherical data of the 18-th plane (r18)]

$\epsilon = 1$, $A4 = -0.338236 \times 10^{-3}$, $A6 = -0.260827 \times 10^{-4}$,
$A8 = 0.334152 \times 10^{-5}$, $A10 = -0.688027 \times 10^{-7}$
[non-spherical data of the 19-th plane (r19)]

$\epsilon = 1$, $A4 = -0.183178 \times 10^{-3}$, $A6 = -0.185327 \times 10^{-5}$,
$A8 = 0.954236 \times 10^{-6}$, $A10 = 0.000000 \times 1000$

TABLE 1

| Conditional Formula | Embodiment 1 | Embodiment 2 | Embodiment 3 | Embodiment 4 |
| --- | --- | --- | --- | --- |
| (1) |f1/f2| | 0.716 | 0.997 | 0.799 | 0.582 |
| (2) D12w/fw | 3.273 | 2.504 | 2.467 | 3.464 |

Meanwhile, the zoom lens system of the present invention as described above can be used in image pick-up apparatuses adapted for forming object image by the above-mentioned zoom lens to allow image pick-up device or element such as CCD or silver salt film to receive image of that object to perform photographic processing, especially digital still camera or video camera (personal computer as information processing equipment, telephone and/or mobile telephone, etc.)

The image pick-up apparatus to which the present invention is applied will be explained below with reference to FIG. 18.

Figure 18:
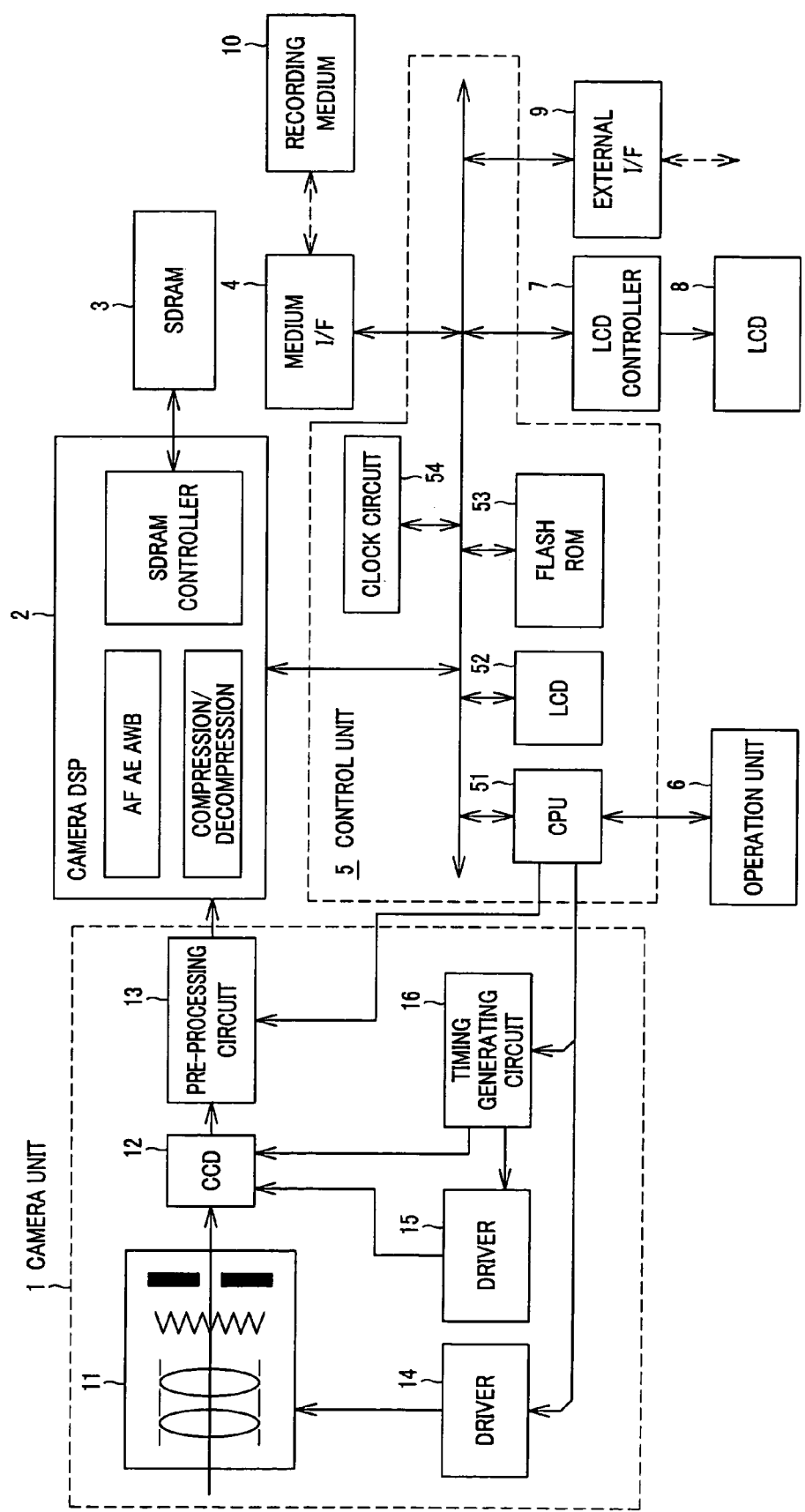
FIG. 18 is a block diagram of an image pick-up apparatus to which the present invention is applied.

FIG. 18 is a block diagram for explaining the image pick-up apparatus to which the present invention is applied. This image pick-up apparatus comprises, as shown in FIG. 18, when roughly classified, a camera unit 1, a camera DSP (Digital Signal Processor) 2, a SDRAM (Synchronous Dynamic Random Access Memory) 3, a medium interface (hereinafter referred to as medium I/F) 4, a control unit 5, an operation unit 6, a LCD (Liquid Crystal Display) controller 7, a LCD 8, and an external interface (hereinafter referred to as I/F) 9, wherein a recording medium 10 is detachably attached.

While it is conceivable that various recording media such as so-called memory card using semiconductor memory, optical recording medium such as recordable DVD (Digital Versatile Disk) or recordable CD (Compact Disc), etc., and/or magnetic disc, etc. may be used as the recording medium 10, explanation will be given in this embodiment on the premise that, e.g., memory card is used as the recording medium 10.

Further, the camera unit 1 comprises, as shown in FIG. 18, an optical block 11, a CCD (Charge Coupled Device) 12 as image pick-up device, a pre-processing circuit 13, a driver 14 for optical block, a driver 15 for CCD, and a timing generating circuit 16. Here, the optical block 11 comprises lens, focus mechanism, shutter mechanism, and iris mechanism, etc.

In addition, the control unit 5 is a microcomputer caused to be of the configuration in which a CPU (Central Processing Unit) 51, a RAM (Random Access Memory) 52, a flash ROM (Read Only Memory) 53, and a clock circuit 54 are connected through a system bus 55, and is adapted to have ability to control respective components of the image pick-up apparatus of this embodiment.

Here, the RAM 52 is used mainly as work area such as temporary storage of intermediate result of processing, etc. Moreover, the flash ROM 53 is adapted so that various programs executed at the CPU 51, and/or data required for processing, etc. are stored. Moreover, the clock circuit 54 is capable of providing current date, current day and current time, and is capable of providing photographing date and hour, etc.

Further, at the time of photographing image, the optical block driver 14 forms, in accordance with control from the control unit 5, such a drive signal to operate the optical block 11 to deliver the drive signal thus formed to the optical block 11 to allow the optical block 11 to be operative. At the optical block 11, focus mechanism, shutter mechanism and iris mechanism are controlled in accordance with drive signals from the optical block driver 14 to take thereinto image of object to offer the image thus taken in to the CCD 12.

The CCD 12 serves to perform photoelectric conversion of image from the optical block 11 to output the image thus obtained, and becomes operative in accordance with a drive signal from the CCD driver 15 to take thereinto image of object from the optical block 11, and to allow image of object which has been taken in (image information) to be an electric signal on the basis of timing signal from the timing generating circuit 16 controlled by the control unit 5 to deliver the electric signal thus obtained to the pre-processing circuit 13.

In this example, in a manner as described above, the timing generating circuit 16 serves to form a timing signal which provides a predetermined timing in accordance with control from the control unit 5. Moreover, the CCD driver 15 serves to form a drive signal to be delivered to the CCD 12 on the basis of the timing signal from the timing generating circuit 16.

The pre-processing circuit 13 serves to perform CDS (Correlated Double Sampling) processing with respect to image information of the electric signal delivered thereto to maintain S/N ratio to be satisfactory, and to perform AGC (Automatic Gain Control) processing to control gain to further perform A/D (Analog/Digital) conversion to form image data caused to be a digital signal.

The image data caused to be digital signal from the pre-processing circuit 13 is delivered to the DSP 2. The DSP 2 implements camera signal processing such as AF (Auto Focus), AE (Auto Exposure) and AWB (Auto White Balance), etc. to the image data delivered thereto. The image data in which various adjustments have been performed in this way is caused to undergo data compression by a predetermined compression system. The image data thus processed is delivered to the recording medium 10 Loaded into the image pick-up apparatus of this embodiment through system bus 55 and medium I/F 4, and is recorded onto the recording medium 10 as file in a manner described below.

Further, with respect to the image data which have been recorded on the recording medium 10, target image data is read out from the recording medium 10 through the medium I/F 4 in accordance with operation input from user which has been accepted through the operation unit 6 composed of touch panel and/or control key, etc. The image data which has been read out in this way is delivered to the DSP2.

The DSP2 performs, with respect to compressed image data which has been read out from the recording medium 10 and has been delivered through the medium I/F 4, decompression processing (expansion processing) of that data compression to deliver the decompressed image data to the LCD controller 7 through the system bus 55. The LCD controller 7 forms, from the image data delivered thereto, an image signal to be delivered to the LCD 8 to deliver the image signal thus formed to the LCD8. Thus, image corresponding to image data recorded on the recording medium 10 is displayed on the display screen of the LCD 8.

In this case, form of display of image is in accordance with display processing program recorded in the ROM. Namely, this display processing program is a program indicating mechanism in which file system which will be described later is recorded, and how to reproduce image.

Moreover, in the image pick-up apparatus of this embodiment, there is provided an external I/F 9. The image pick-up apparatus may be connected to, e.g., external personal computer through the external I/F 9 to receive supply of image data from the personal computer to record the data thus delivered onto recording medium loaded therewithin, or image data recorded at recording medium loaded therewithin may be delivered to external personal computer, etc.

Further, communication module may be connected to the external I/F 9 to thereby connect the image pick-up apparatus to network, e.g., Internet, etc. to acquire various image data and/or other information through the network to record such image data or information with respect to recording medium loaded therewithin, or data recorded at recording medium loaded therewithin may be transmitted to the other side serving as target through network.

Further, also with respect to information such as image data, etc. which is acquired through external personal computer or network and is recorded at the recording medium, it is a matter of course to read out, in a manner as described above, such image data or information at the image pick-up apparatus of this embodiment to reproduce it to display such information on the LCD 8 so that user can utilize such information.

It is to be noted that external I/F 9 may be also provided as interface for wire such as IEEE (Institute of Electrical and Electronics Engineers) 1394, USB (Universal Serial Bus), etc., and may be provided as wireless interface by light or electric wave. Namely, the external I/F 9 may be either wire or wireless interface.

As stated above, the image pick-up apparatus of this embodiment can photograph image of object to have ability to record the image thus photographed onto recording medium loaded within the image pick-up apparatus, and to have ability to read out image data recorded on the recording medium to reproduce such image data to utilize it. In addition, the image pick-up apparatus can receive offer of image data through external personal computer or network to record the image data thus obtained onto recording medium loaded therewithin, or to read out such image data to reproduce it.

It should be noted that while CCD is used as the image pick-up device, CMOS sensor (Complementary Metal-oxide Semiconductor) may be used.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

INDUSTRIAL APPLICABILITY

The zoom lens to which the present invention has been applied not only can be used at digital still camera or video camera, but also can be used at silver salt camera by disposing silver salt film in place of CCD. Further, the zoom lens to which the present invention has been applied can be used at camera included or externally attached at personal computer, telephone and/or mobile telephone, etc.

The invention claimed is:

1. A zoom lens, comprising in order from object side:
a first lens group comprising a reflection member for bending or folding the optical axis and having negative refractive power, the first lens group being fixed during magnification changing or adjustment operation;
a second lens group having negative refractive power, the second lens group being movable in the magnification changing or adjustment operation; and
a light quantity adjustment member fixed in the magnification changing or adjustment operation and serving to adjust light quantity,
wherein the following formula is satisfied:

$1.6 < D12w/fw < 5$, wherein D12w is a distance between a most image side surface of a lens placed next to the reflection member at object side of the reflection member and a most object side surface of an entire second group, at a wide-angle end state, and
wherein fw is a focal length of an entire system at the wide-angle end state.

2. The zoom lens as set forth in claim 1, wherein the following conditional formula (1) is satisfied:

$$0.1 < |f1/f2| < 1.2 \qquad (1)$$

wherein, f1: focal length of the first lens group; and
f2: focal length of the second lens group.

3. The zoom lens as set forth in claim 1, wherein the reflection member is a perpendicular prism, and refractive index of the perpendicular prism is 1.7 or more.

4. An image pick-up apparatus comprising:
a zoom lens comprising in order from object side:
a first lens group including a reflection member for bending or folding the optical axis having negative refractive power,
a second lens group having negative refractive power, the second lens group being movable in the magnification changing or adjustment operation;
a light quantity adjustment member fixed in the magnification changing or adjustment operation and serving to adjust light quantity,
wherein the following formula is satisfied:

$1.6 < D12w/fw < 5$, wherein D12w is a distance between a most image side surface of a lens placed next to the reflection member at object side of the reflection member and a most object side surface of an entire second group, at a wide-angle end state, and
wherein fw is a focal length of an entire system at the wide-angle end state; and
an image pick-up device for converting an optical image formed by zoom lens into an electric signal.

5. The image pick-up apparatus as set forth in claim 4, wherein the first lens group is fixed during magnification changing or adjustment operation.

* * * * *